(12) United States Patent
Turaga et al.

(10) Patent No.: US 7,201,839 B2
(45) Date of Patent: Apr. 10, 2007

(54) DESULFURIZATION AND NOVEL COMPOSITIONS FOR SAME

(75) Inventors: Uday T. Turaga, Bartlesville, OK (US); Jason J. Gislason, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/735,562

(22) Filed: Dec. 12, 2003

(65) Prior Publication Data
US 2005/0127325 A1   Jun. 16, 2005

(51) Int. Cl.
*C10G 45/04* (2006.01)
(52) U.S. Cl. .................. 208/208 R; 208/244; 208/247; 208/266; 208/299; 208/307; 585/802; 585/526
(58) Field of Classification Search ............ 208/208 R, 208/244, 247, 266, 299, 307; 585/802, 526
See application file for complete search history.

(56) References Cited

U.S. PATENT DOCUMENTS

| 3,242,069 | A | 3/1966 | Gladrow et al. ............. 208/120 |
| 4,377,504 | A | 3/1983 | Roberts et al. ......... 252/455 Z |
| 4,415,440 | A | 11/1983 | Roberts et al. ............. 208/120 |
| 4,746,763 | A | 5/1988 | Kocal .......................... 585/417 |
| 5,360,536 | A | 11/1994 | Nemeth et al. ............. 208/248 |
| 5,807,799 | A | 9/1998 | Drake et al. .................. 502/67 |
| 6,150,300 | A | 11/2000 | Khare et al. ................ 502/407 |
| 6,274,533 | B1 * | 8/2001 | Khare ........................ 502/343 |
| 6,579,444 | B2 * | 6/2003 | Feimer et al. .............. 208/243 |

* cited by examiner

*Primary Examiner*—Tam M. Nguyen
(74) *Attorney, Agent, or Firm*—Kameron D. Kelly; Bronwyn A. Welvaert

(57) ABSTRACT

A composition comprising a metal oxide, a silica-containing material, a gallium-containing material, an aluminum-containing material, and a promoter, wherein at least a portion of the promoter is present as a reduced-valence promoter and methods of preparing such composition are disclosed. The thus-obtained composition is employed in a desulfurization zone to remove sulfur from a hydrocarbon stream.

8 Claims, No Drawings

DESULFURIZATION AND NOVEL COMPOSITIONS FOR SAME

This invention relates to the removal of sulfur from hydrocarbon streams. In another aspect, this invention relates to compositions suitable for use in the desulfurization of fluid streams of cracked gasolines and diesel fuels. A further aspect of this invention relates to processes for the production of compositions for use in the removal of sulfur bodies from fluid streams of cracked gasolines and diesel fuels.

BACKGROUND OF THE INVENTION

The need for cleaner burning fuels has resulted in a continuing worldwide effort to reduce sulfur levels in hydrocarbon streams such as gasoline and diesel fuels. The reduction of sulfur in such hydrocarbon streams is considered to be a means for improving air quality because of the negative impact the sulfur has on performance of sulfur sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Thermally processed gasolines such as, for example, thermally cracked gasoline, visbreaker gasoline, coker gasoline and catalytically cracked gasoline (hereinafter collectively referred to as "cracked gasoline") contains, in part, olefins, aromatics, sulfur, and sulfur containing compounds. Since most gasolines, such as, automobile gasolines, racing gasolines, aviation gasolines, boat gasolines, and the like contain a blend of, at least in part, cracked gasoline, reduction of sulfur in cracked gasoline will inherently serve to reduce the sulfur levels in most gasolines, such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the rules to date have focused on the required level of reduction, the geographical areas in need of lower sulfur gasoline, and the time frame for implementation.

As the concern over the impact of automotive air pollution continues, it is clear that further effort to reduce the sulfur level in automotive fuels will be required. While the current gasoline products contain about 330 parts per million (ppm) sulfur, the US Environmental Protection Agency recently issued regulations requiring the average sulfur content in gasoline to be less than 30-ppm average with an 80-ppm cap. By 2008, the standards will effectively require every blend of gasoline sold in the United States to meet the 30-ppm level.

In addition to the need to be able to produce low sulfur content automotive fuels, there is also a need for a process, which will have a minimal effect on the olefin content of such fuels so as to maintain the octane number (both research and motor octane number). Such a process would be desirable since saturation of olefins greatly affects the octane number. Such adverse effect on the olefin content is generally due to the severe conditions normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur containing compounds to remove from cracked gasoline. In addition, there is a need to avoid a system wherein the conditions are such that the aromatic content of the cracked gasoline is lost through saturation. Thus, there is a need for a process, which achieves desulfurization and maintains the octane number.

In addition to the need for removal of sulfur from cracked gasolines, there is a need for the petroleum industry to reduce the sulfur content in diesel fuels. In general, it is much harder to remove sulfur from diesel as compared to gasoline. In removing sulfur from diesel fuels by hydrodesulfurization, the cetane is improved but there is a large cost in hydrogen consumption. Such hydrogen is consumed by both hydrodesulfurization and aromatic hydrogenation reaction.

Thus, there is a need for a desulfurization process without a significant consumption of hydrogen so as to provide a more economical process for the treatment of cracked gasolines and diesel fuels.

As a result of the lack of success in providing a successful and economically feasible process for the reduction of sulfur levels in cracked gasolines and diesel fuels, it is apparent that there is a need for a better process for the desulfurization of such hydrocarbon streams which has minimal effect on octane levels while achieving high levels of sulfur removal.

Traditionally, compositions used in processes for the removal of sulfur from hydrocarbon streams have been agglomerates used in fixed bed applications. Because of the various process advantages of fluidized beds, hydrocarbon streams are sometimes processed in fluidized bed reactors. Fluidized bed reactors have advantages over fixed bed reactors, such as, for example, better heat transfer and better pressure drop. Fluidized bed reactors generally use reactants that are particulate. The size of these particulates is generally in the range of from about 1 micron to about 1000 microns. However, the reactants used generally do not have sufficient attrition resistance for all applications. Consequently, finding a composition with sufficient attrition resistance that removes sulfur from these hydrocarbon streams and that can be used in fluidized, transport, moving, or fixed bed reactors and producing that composition in an economical manner is desirable and would be a significant contribution to the art and to the economy.

SUMMARY OF THE INVENTION

It is thus an object of the present invention is to provide novel compositions and novel methods for the production of compositions, which are usable in the desulfurization of hydrocarbon streams.

Another object of the present invention is to provide a process for the removal of sulfur from hydrocarbon streams, which minimizes the consumption of hydrogen and the saturation of olefins and aromatics contained in such streams.

A still further object of the present invention is to provide more highly active compositions, which facilitate the removal of sulfur from cracked gasoline or diesel fuel.

A still further object of the present invention is to provide a desulfurized cracked gasoline that contains less than about 100 ppm, preferably less than 50 ppm, of sulfur based on the weight of the desulfurized cracked gasoline, and which contains essentially the same amount of olefins and aromatics as are in the cracked gasoline from which such desulfurized cracked gasoline was made. Another further object is to provide a desulfurized diesel fuel.

The first embodiment of this invention includes a novel composition comprising, consisting of, or consisting essentially of:

(a) a metal oxide;
(b) a silica-containing material;
(c) a gallium-containing material;
(d) an aluminum-containing material selected from the group consisting of alumina, aluminate, and combinations thereof; and
(e) a promoter metal wherein at least a portion of said promoter metal is present as a reduced valence promoter.

The second embodiment of this invention includes a novel method for the production of a composition comprising, consisting of, or consisting essentially of:

(a) a step selected from the group consisting of:
 (1) incorporating a gallium-containing substance into or onto a first calcined mixture, said first calcined mixture comprising a liquid, a metal-containing compound, a silica-containing material, alumina, and a promoter, to form a first incorporated mixture; and
 (2) incorporating a gallium-containing substance in a promoter simultaneously into or onto a second calcined mixture comprising a liquid, a metal-containing compound, silica-containing material, and alumina, to form a second incorporated mixture;
(b) drying said first incorporated mixture or said second incorporated mixture to form a dried incorporated mixture;
(c) calcining said dried incorporated mixture to form a calcined incorporated mixture;
(d) reducing said calcined incorporated mixture with a suitable reducing agent under suitable conditions to produce a composition having a reduced valence promoter content therein, and
(e) recovering said composition.

The third embodiment of this invention includes a process for the removal of sulfur from a hydrocarbon stream comprising:

a) contacting the hydrocarbon stream with a composition from the first or second embodiments in a desulfurization zone under conditions such that there is formed a desulfurized hydrocarbon stream and a sulfurized composition;

b) separating the desulfurized hydrocarbon stream from the sulfurized composition thereby forming a separated desulfurized hydrocarbon stream and a separated sulfurized composition;

c) regenerating at least a portion of the separated sulfurized composition in a regeneration zone to remove at least a portion of the sulfur contained therein and/or thereon thereby forming a regenerated composition;

d) reducing the regenerated composition in a reduction zone so as to provide a reduced composition having a reduced valence promoter content therein which will effect the removal of sulfur from a hydrocarbon stream when contacted with same; and thereafter e) returning at least a portion of the reduced composition to the desulfurization zone.

Other aspects, objectives, and advantages of the present invention will be apparent from the detailed description of the invention and the appended claims.

DETAILED DESCRIPTION OF THE INVENTION

The term "gasoline" denotes a mixture of hydrocarbons boiling in the range of from about 37.8° C. to about 260° C., or any fraction thereof Examples of suitable gasoline include, but are not limited to, hydrocarbon streams in refineries such as naphtha, straight run naphtha, coker naphtha, catalytic gasoline, visbreaker naphtha, alkylate, isomerate, reformate, and the like and combinations thereof.

The term "cracked gasoline" denotes a mixture of hydrocarbons boiling in the range of from about 37.8° C. to about 260° C., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked gasoline include, but are not limited to, coker gasoline, thermally cracked gasoline, visbreaker gasoline, fluid catalytically cracked gasoline, heavy oil cracked gasoline, and the like and combinations thereof. In some instances, the cracked gasoline may be fractionated and/or hydrotreated prior to desulfurization when used as a hydrocarbon stream in the process of the present invention.

The term "diesel fuel" denotes a mixture of hydrocarbons boiling in the range of from about 148.9° C. to about 398.9° C., or any fraction thereof. Examples of suitable diesel fuels include, but are not limited to, light cycle oil, kerosene, jet fuel, straight-run diesel, hydrotreated diesel, and the like and combinations thereof.

The term "sulfur" denotes sulfur in any form such as elemental sulfur or a sulfur compound normally present in a hydrocarbon-containing fluid such as cracked gasoline or diesel fuel. Examples of sulfur which can be present during a process of the present invention usually contained in a hydrocarbon stream, include, but are not limited to, hydrogen sulfide, carbonyl sulfide (COS), carbon disulfide ($CS_2$), mercaptans (RSH), organic sulfides (R—S—R), organic disulfides (R—S—S—R), thiophenes, substituted thiophenes, organic trisulfides, organic tetrasulfides, benzothiophenes, alkyl thiophenes, alkyl benzothiophenes, alkyl dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

The term "fluid" denotes gas, liquid, vapor, and combinations thereof.

The term "gaseous" denotes that state in which the hydrocarbon-containing fluid, such as cracked-gasoline or diesel fuel, is primarily in a gas or vapor phase.

In accordance with the first embodiment of the present invention, the inventive composition comprises, consists of, or consists essentially of:

(a) a metal oxide;
(b) a silica-containing material;
(c) a gallium-containing material;
(d) an aluminum-containing material selected from the group consisting of alumina, aluminate, and combinations thereof; and
(e) a promoter metal wherein at least a portion of said promoter metal is present as a reduced valence promoter.

The term "metal" denotes metal in any form such as elemental metal or a metal-containing compound. In the method of the first embodiment, preferably a zinc-containing compound is used, producing a composition containing a zinc oxide.

The term "metal oxide", as used herein, denotes any oxide of a metal. In the inventive composition, the metal oxide comprises a metal selected from the group consisting of zinc, manganese, silver, copper, cerium, scandium, lanthanum, iron, tin, cadmium, gallium, indium, niobium, tantalum, and combinations of any two or more thereof.

The term "metal oxide" also denotes metal oxide in any form such as a metal oxide or a metal oxide precursor.

The metal oxide will preferably be present in the inventive composition in an amount in the range of from about 10 to about 90 weight percent metal oxide based on the total weight of the inventive composition, more preferably in an amount in the range of from about 30 to about 80 weight percent metal oxide, and most preferably in an amount in the range of from about 40 to about 70 weight percent metal oxide.

The term "promoter" metal denotes any component, which when added to the composition of the present invention, helps promote the desulfurization of hydrocarbon streams. Such promoter metals can be at least one metal, metal oxide, precursor for the metal oxide, solid solution of more than one metal, or alloy of more than one metal wherein the metal component is selected from the group consisting of nickel, cobalt, iron, manganese, copper, zinc, molybdenum, tungsten, silver, tin, antimony, vanadium, gold, platinum, ruthenium, iridium, chromium, palladium, titanium, zirconium, rhodium, rhenium, and combinations of any two or more thereof.

Some examples of promoter metal containing compounds include metal acetates, metal carbonates, metal nitrates, metal sulfates, metal thiocyanates, and the like and combinations thereof. Preferably, the metal of the promoter is nickel.

The inventive composition having a reduced valence promoter metal content is a composition that has the ability to react chemically and/or physically with sulfur. It is also preferable that the inventive composition removes diolefins and other gum forming compounds from cracked gasoline.

During the preparation of a composition of the present invention, the promoter metal selected from the group consisting of metals, metal oxides, and the like and combinations thereof may initially be in the form of a metal-containing compound and/or a metal oxide precursor. It should be understood that when the promoter metal is initially a metal-containing compound and/or a metal oxide precursor, a portion of, or all of, such compound and/or precursor may be converted to the corresponding metal or metal oxide of such compound and/or precursor during the inventive process disclosed herein.

Typically, the common oxidation state of the promoter metal is combined with the metal oxide portion of the inventive composition produced by the inventive methods. The number of oxygen atoms associated with the promoter must be reduced to form a reduced valence promoter metal. Consequently, at least a portion of the promoter metal present in the inventive composition must be present as a reduced valence promoter metal. While not wishing to be bound by theory, it is believed that the reduced valence promoter metal can chemisorb, cleave, or remove sulfur. Thus, either the number of oxygen atoms associated with the promoter metal is reduced or the oxidation state of the promoter metal is a zero-valent metal. For example, if nickel is the promoter metal, nickel oxide (NiO) can be used and the reduced valence nickel (promoter metal) can be either nickel metal ($Ni^0$) or a non-stoichiometric nickel oxide having a formula of $NiO_{(1-x)}$ wherein $0<x<1$. If tungsten is the promoter metal, tungsten oxide ($WO_3$) can be used and the reduced valence tungsten (promoter metal) can be either tungsten oxide ($WO_3$), tungsten metal ($W^0$), or a non-stoichiometric tungsten oxide having a formula of $WO_{(3-y)}$ wherein $0<y<3$.

Preferably, the promoter metal is present in an amount, which will effect the removal of sulfur from the hydrocarbon stream when contacted with the composition under desulfurization conditions. Of the total quantity of the promoter metal present in the inventive composition, it is preferred for at least about 10 weight percent of the promoter metal to be present in the form of a reduced valence promoter metal, more preferably at least about 40 weight percent of the promoter metal is a reduced valence promoter metal, and most preferably at least 80 weight percent of the promoter metal is a reduced valence promoter metal for best activity in sulfur removal. The reduced valence promoter metal will generally be present in the inventive composition in an amount in the range of from about 1 to about 60 weight percent reduced valence promoter metal based on the total weight of the inventive composition, preferably in an amount in the range of from about 5 to about 40 weight percent reduced valence promoter metal, and most preferably in an amount in the range of from 8 to 20 weight percent reduced valence promoter metal for best activity in sulfur removal. When the promoter metal comprises a bimetallic promoter metal, the bimetallic promoter metal should comprise a ratio of the two metals forming such bimetallic promoter metal in the range of from about 20:1 to about 1:20.

The silica-containing material used in the preparation of, and present in the compositions produced by the inventive methods may be either in the form of silica or in the form of one or more silica-containing materials.

Any suitable silica-containing material may be employed in the composition such as, for example, diatomite, crushed expanded perlite, silica colloid, silica gel, precipitated silica, and the like, and combinations thereof. In addition, silicon compounds that are convertible to silica such as silicic acid, ammonium silicate, and the like, and combinations thereof can also be employed.

More preferably the silica-containing material is in the form of crushed expanded perlite. The term "perlite" as used herein is the petrographic term for a siliceous volcanic rock, which naturally occurs in certain regions throughout the world. The distinguishing feature, which sets it apart from other volcanic minerals, is its ability to expand four to twenty times its original volume when heated to certain temperatures. When heated above 871.1° C., crushed perlite expands due to the presence of combined water within the crude perlite rock. The combined water vaporizes during the heating process and creates countless tiny bubbles in the heat softened glassy particles. The glass sealed bubbles account for its lightweight. Expanded perlite can be manufactured to weigh as little as 2.5 lbs per cubic foot.

The typical elemental analysis of expanded perlite is: silicon 33.8%, aluminum 7%, potassium 3.5%, sodium 3.4%, calcium 0.6%, magnesium 0.2%, iron 0.6%, trace elements 0.2%, oxygen (by difference) 47.5%, and bound water 3%.

Typical physical properties of expanded perlite are: softening point 1600–2000° F., fusion point 2300–2450° F., pH 6.6–6.8, and specific gravity 2.2–2.4.

The term "crushed expanded perlite" or "milled expanded perlite" as used herein denotes that form of expanded perlite which has first been subjected to milling so as to yield a particle size of about 20 microns to about 500 microns, and then heated with a flame at a temperature of about 871.1° C., and finally subjected to crushing in a hammer mill. While not wishing to be bound to any particular theory, it is believed that the shape of the crushed expanded perlite impacts the activity of the final composition produced by the inventive methods.

The inventive composition contains an aluminum-containing material selected from the group consisting of alumina, aluminate, and combinations thereof. Alumina can be used to produce the composition. The alumina employed in the preparation of the composition can be any suitable commercially available aluminum-containing substance of which at least a portion can be converted to an aluminate upon calcinations. Examples include, but are not limited to, aluminum chlorides, aluminum nitrates, colloidal alumina solutions, hydrated aluminas, peptized aluminas, and, generally, those alumina compounds produced by the dehydration of alumina hydrates. The preferred alumina is hydrated alumina such as, for example, bohemite or pseudobohemite for best activity and sulfur removal. When a composition is exposed to high temperatures (e.g., during calcinations) at least a portion, preferably a substantial portion of the alumina can be converted to an aluminate, preferably a zinc aluminate spinel.

The aluminum-containing material will preferably be present in the composition in an amount in the range of from about 1.0 to about 30 weight percent, preferably in an amount in the range of from about 5 to about 25 weight percent, and most preferably, in the range of from 10 to 22 weight percent, based on the total weight of the composition.

The silica-containing material will preferably be present in the composition in an amount in the range of from about 10 to about 40 weight percent silica-containing material based on the total weight of the composition, more preferably in an amount in the range of from about 12 to about 35 weight percent, and most preferably in the range of from 15 to 30 weight percent.

The inventive composition also contains a gallium-containing material.

The gallium-containing material will preferably be present in the composition in an amount in the range of from about 0.05 to about 30 weight percent based on the total weight of the composition. More preferably, the gallium-containing material is present in an amount in the range of from about 1 to about 20 weight percent, and most preferably, the gallium-containing material is present in an amount in the range of from 5 to 10 weight percent.

The composition can be a particulate in the form of one of granules, extrudates, tablets, spheres, pellets, or microspheres. Preferably, the particulate is a fluidizable microsphere.

In accordance with the second embodiment of the present invention, the inventive composition can be produced by the following inventive method, which comprises, consists of, or consists essentially of:

(a) a step selected from the group consisting of:
  (1) incorporating a gallium-containing substance into or onto a first calcined mixture, said first calcined mixture comprising a liquid, a metal-containing compound, a silica-containing material, alumina, and a promoter, to form a first incorporated mixture; and
  (2) incorporating a gallium-containing substance and a promoter simultaneously into or onto a second calcined mixture comprising a liquid, a metal-containing compound, silica-containing material, and alumina, to form a second incorporated mixture;

(b) drying said first incorporated mixture or said second incorporated mixture to form a dried incorporated mixture;

(c) calcining said dried incorporated mixture to form a calcined incorporated mixture;

(d) reducing said calcined incorporated mixture with a suitable reducing agent under suitable conditions to produce a composition having a reduced valence promoter content therein, and (e) recovering said composition.

In the inventive production method, the composition can generally be prepared by admixing a liquid, a metal-containing compound, a silica-containing material, alumina, and a promoter in appropriate proportions by any suitable method or manner which provides for the intimate mixing of such components to thereby provide a substantially homogenous mixture thereof comprising a liquid, a metal-containing compound, a silica-containing material, alumina, and a promoter metal. The term "admixing," as used herein, denotes mixing components in any order and/or any combination or sub-combination. Any suitable means for admixing the components of the composition can be used to achieve the desired dispersion of such components. Examples of suitable admixing include, but are not limited to, mixing tumblers, stationary shelves or troughs, Eurostar mixers, which are of the batch or continuous type, impact mixers, and the like. It is presently preferred to use a Eurostar mixer in the admixing of the components of the inventive composition.

The liquid can be any solvent capable of dispersing a metal-containing compound, a silica-containing material, alumina, and a promoter metal, and, preferably, the liquid can be selected from the group consisting of water, ethanol, acetone and combinations of any two or more thereof. Most preferably, the liquid is water.

The metal-containing compound (preferably a zinc-containing compound) used in the preparation of a composition in the second embodiment of the present inventive method can either be in the form of a metal oxide or in the form of one or more metal compounds that are convertible to a metal oxide under the conditions of preparation described herein. Examples of suitable metal compounds include, but are not limited to, a metal sulfide, a metal sulfate, a metal hydroxide, a metal nitrate, and the like and combinations thereof. Preferably, the metal-containing compound is in the form of a powdered metal oxide.

The above-listed components of the composition are mixed to provide a mixture which can be in the form selected from the group consisting of a wet mix, dough, paste, slurry and the like. Preferably, the mixture is in the form of a slurry. Such mixture can then be shaped to form a particulate selected from the group consisting of a granule, an extrudate, a tablet, a sphere, a pellet, or a microsphere.

The promoter metal can also be added to the mixture by means of incorporation.

A preferred method of incorporating is to impregnate using any conventional wetness impregnation technique (i.e. essentially completely or partially filling the pores of a substrate material with a solution of the incorporating elements) for impregnating a substrate. This preferred method uses an impregnating solution comprising the desirable concentration of a promoter to ultimately provide an incorporated mixture that can then be subjected to drying and calcining (which can convert at least a portion of the alumina to an aluminate) followed by reduction with a reducing agent such as hydrogen.

A preferred impregnating solution comprises a solution formed by dissolving a metal containing compound, preferably such metal containing compound is in the form of a metal salt such as a metal chloride, a metal nitrate, a metal sulfate, and the like and combinations thereof, in a solvent such as water, alcohols, esters, ethers, ketones, and combinations thereof. The concentration of the metal promoter in the solution can be in the range of from about 0.1 gram of metal promoter per gram of solution to about 16.6 grams of metal promoter per 100 grams of solution. Preferably, the weight ratio of metal promoter to the solvent of such solution can be in the range of from about 1:1 to about 4:1 but, more preferably it is in the range of from 1.5:1 to 3:1. It is preferred for the particulates to be impregnated with a nickel component by use of a solution containing nickel nitrate hexahydrate dissolved in water.

When the particulation is achieved, preferably by spray drying, a dispersant component can optionally be utilized and can be any suitable compound that helps to promote the spray drying ability of the mix, which is preferably in the form of a slurry. In particular, these components are useful in preventing deposition, precipitation, settling, agglomerating, adhering, and caking of solid particles in a fluid medium. Suitable dispersants include, but are not limited to, condensed phosphates, sulfonated polymers, and combinations thereof. The term "condensed phosphates" refers to any dehydrated phosphate containing more than one phosphorus atom and having a phosphorus-oxygen-phosphorus bond. Specific examples of suitable dispersants include sodium pyrophosphate, sodium metaphosphate, sulfonated styrene maleic anhydride polymer, and combinations thereof. The amount of dispersant component used is generally in the range of from about 0.01 weight percent based on the total weight of the components to about 10 weight percent. Preferably, the amount of the dispersant component used is generally in the range of from about 0.1 weight percent to about 8 weight percent.

In preparing the preferred spray dried composition, an acid component can be used. In general, the acid in the acid component can be an organic acid or a mineral acid such as nitric acid. If the acid component is an organic acid, it is preferred to be a carboxylic acid. If the acid component is a mineral acid, it is preferred to be a nitric acid or a phosphoric acid. Mixtures of these acids can also be used. Generally, the acid is used with water to form a dilute aqueous acid solution. The amount of acid in the acid component is generally in the range of from about 0.01 volume percent based on the total volume of the acid component to about 20 volume percent.

Generally, the spray-dried material has a mean particle size in the range of from about 10 micrometers to about 1000 micrometers, preferably in the range of from about 20 micrometers to from about 150 micrometers.

The term "mean particle size" refers to the size of the particulate material as determined by using a RO-TAP® Testing Sieve Shaker, manufactured by W. S. Tyler Inc., of Mentor, Ohio, or other comparable sieves. The material to be measured is placed in the top of a nest of standard 8-inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

Then either the mixture or the particulated mixture is dried to form a dried mixture. The drying conditions, as referred to herein, can include a temperature in the range of from about 65.5° C. to about 550° C., preferably in the range of from about 87.8° C. to about 210° C. and, most preferably, in the range of from 93.3° C. to 176.7° C. Such drying conditions can also include a time period generally in the range of from about 0.5 hour to about 60 hours, preferably in the range of from about 1 hour to about 40 hours, and most preferably, in the range of from 1.5 hours to 20 hours. Such drying conditions can also include a pressure generally in the range of from about atmospheric (i.e., about 14.7 pounds per square inch absolute) to about 150 pounds per square inch absolute (psia), preferably in the range of from about atmospheric to about 100 psia and, most preferably about atmospheric, so long as the desired temperature can be maintained. Any drying method(s) known to one skilled in the art such as, for example, air drying, heat drying, and the like and combinations thereof can be used. Preferably, heat drying is used.

The dried mixture is then calcined to form a calcined mixture. Preferably, the dried mixture is calcined in an oxidizing atmosphere such as in the presence of oxygen or air. The calcining conditions, as referred to herein, can include a temperature in the range of from about 204.4° C. to about 815.5° C., preferably in the range of from about 426.7° C. to about 815.5° C. and, more preferably, in the range of from 482.2° C. to 760° C. Such calcining conditions can also include a pressure, generally in the range of from about 7 psia to about 750 psia, preferably in the range of from about 7 psia to about 450 psia and, most preferably, in the range of from 7 psia to 150 psia, and a time period in the range of from about 1 hour to about 60 hours, preferably for a time period in the range of from about 1 hour to about 20 hours and, most preferably, for a time period in the range of from 1 hour to 15 hours. In the process of this invention, the calcination can convert at least a portion of the alumina to an aluminate.

The calcined mixture is then incorporated with a gallium-containing substance. Preferably, the gallium-containing substance is incorporated by means of impregnation, as described above. The gallium-containing substance can be incorporated simultaneously with the promoter, or at a different time. Any suitable gallium-containing substance can be used. Examples include, but are not limited to, gallium nitrates, gallium chlorides, and gallium oxides. Preferably, the gallium-containing substance is a gallium nitrate.

Following the incorporating of the dried mixture, preferably by impregnation, with a gallium-containing substance, the resulting incorporated mixture is then subjected to drying under drying conditions, as described above, to form a dried incorporated mixture, and calcined under calcining conditions, as described above, to form a calcined incorporated mixture. The calcined incorporated mixture can then be subjected to reduction with a reducing agent, preferably hydrogen, so as to produce a composition having a substantially reduced valence promoter content therein, preferably a substantially zero-valent promoter content therein, with such zero-valent promoter being present in an amount sufficient to permit the removal of sulfur from a hydrocarbon stream such as cracked gasoline or diesel fuel, according to the process disclosed herein. The composition can then be recovered.

The reduction conditions can include a temperature in the range of from about 37.8° C. to about 815.5° C., a pressure in the range of from about 15 psia to about 1500 psia and for a time sufficient to permit the formation of a reduced valence promoter.

The third embodiment of this invention includes a novel process for the removal of sulfur from a hydrocarbon stream. This process comprises:

a) contacting the hydrocarbon stream with a composition of the first or second embodiments of the present invention in a desulfurization zone under conditions such that there is formed a desulfurized hydrocarbon stream and a sulfurized composition;

b) separating the desulfurized hydrocarbon stream from the sulfurized composition thereby forming a separated desulfurized hydrocarbon stream and a separated sulfurized composition;

c) regenerating at least a portion of the separated sulfurized composition in a regeneration zone so as to remove at least a portion of the sulfur contained therein and/or thereon thereby forming a regenerated composition;

d) reducing the regenerated composition in a reduction zone so as to provide a reduced composition having a reduced valence promoter metal content therein which will effect the removal of sulfur from a hydrocarbon stream when contacted with same; and thereafter e) returning at least a portion of the reduced composition to the desulfurization zone.

The contacting, in step a), of the hydrocarbon stream with the composition prepared by the methods of the first or second embodiments in the desulfurization zone can be by any method known to those skilled in the art.

The desulfurization zone can be any zone wherein desulfurization of a hydrocarbon stream can take place. Examples of suitable zones are fixed bed reactors, moving bed reactors, fluidized bed reactors, transport reactors, and the like. Presently a fluidized bed reactor or a fixed bed reactor is preferred.

The desulfurization zone of step a) includes the following conditions: total pressure, temperature, weight hourly space velocity, and hydrogen flow. These conditions are such that the inventive composition can desulfurize the hydrocarbon stream to produce a desulfurized hydrocarbon stream and a sulfurized composition.

The total pressure can be in the range of from about 15 pounds per square inch absolute (psia) to about 1500 psia. However, it is presently preferred that the total pressure be in a range of from about 50 psia to about 500 psia.

In general, the temperature should be sufficient to keep the hydrocarbon stream in essentially a vapor or gas phase. While such temperatures can be in the range of from about 37.8° C. to about 537.8° C., it is presently preferred that the temperature be in the range of from about 204.4° C. to about 426.7° C. when treating a cracked-gasoline, and in the range of from about 260° C. to about 482.2° C. when treating a diesel fuel.

Weight hourly space velocity ("WHSV") is defined as the numerical ratio of the rate at which a hydrocarbon stream is charged to the desulfurization zone in pounds per hour at standard conditions at temperature and pressure (STP) divided by the pounds of composition contained in the desulfurization zone to which the hydrocarbon stream is charged. In the practice of the present invention, such WHSV should be in the range of from about 0.5 hr.$^{-1}$ to about 50 hrs.$^{-1}$, preferably in the range of from about 1 hr.$^{-1}$ to about 50 hrs.$^{-1}$.

Any suitable hydrocarbon stream, which comprises, consists of, or consists essentially of sulfur containing hydrocarbons can be used as the feed to be contacted with the inventive composition. The hydrocarbon stream preferably comprises, consists of, or consists essentially of a fuel selected from the group consisting of a cracked gasoline, diesel fuel, and combinations thereof.

The amount of sulfur in the hydrocarbon stream can be in the range of from about less than 10-ppm sulfur by weight of the hydrocarbon stream to about 50,000 ppm. When the hydrocarbon stream is cracked gasoline, the amount of sulfur can be in the range of from about less than 10 ppm sulfur by weight of the cracked gasoline to about 10,000 ppm sulfur by weight of the cracked gasoline. When the hydrocarbon stream is diesel fuel, the amount of sulfur can be in the range of from about less than 10 ppm sulfur by weight of the diesel fuel to about 50,000 ppm sulfur by weight of the diesel fuel.

As used herein, the terms "sulfur" or "ppmw sulfur" denotes the amount of atomic sulfur (about 32 atomic mass units) contained in the sulfur-containing hydrocarbons of the hydrocarbon stream, based on the total weight of the hydrocarbon stream, not the atomic mass, or weight, of a sulfur compound, such as an organo-sulfur compound.

The cracked gasoline or diesel fuel, suitable as a feed in a process of the present invention, is a composition that contains, in part, olefins, aromatics, sulfur, paraffins and naphthenes.

The amount of olefins in cracked gasoline is generally in the range of from about 10 to about 35 weight percent olefins based on the total weight of the cracked gasoline. For diesel fuel there is essentially no olefin content.

The amount of aromatics in cracked gasoline is generally in the range of from about 20 to about 40 weight percent aromatics based on the total weight of the cracked gasoline. The amount of aromatics in diesel fuel is generally in the range of from about 10 to about 90 weight percent aromatics based on the total weight of the diesel fuel.

In carrying out the desulfurization step of a process of the present invention, it is preferred that the hydrocarbon stream be in a gas or vapor phase. However, in the practice of the present invention, it is not essential that such hydrocarbon stream be totally in a gas or vapor phase.

In carrying out the desulfurizing step, it is presently preferred that an agent be employed which interferes with any possible chemical or physical reacting of the olefinic or aromatic compounds in the hydrocarbon stream which is being treated with the inventive composition. Preferably such agent is hydrogen.

Hydrogen flow in the desulfurization zone is generally such that the mole ratio of hydrogen to the hydrocarbon stream is the range of from about 0.1 to about 10, preferably in the range of from about 0.2 to about 3.

If desired, during the desulfurization of the cracked gasoline or diesel fuel, diluents such as methane, carbon dioxide, flue gas, nitrogen, and the like and combinations thereof can be used. Thus, it is not essential to the practice of the present invention that a high purity hydrogen be employed in achieving the desired desulfurization of the hydrocarbon stream such as, but not limited to, cracked gasoline or diesel fuel.

It is presently preferred when utilizing a fluidized bed reactor system that a composition be used having a particle size in the range of from about 10 micrometers to about 1000 micrometers. Preferably, such composition should have a particle size in the range of from about 20 micrometers to about 500 micrometers, and, more preferably, in the range of from 30 micrometers to 400 micrometers. When a fixed bed reactor system is employed for the practice of a desulfurization process of the present invention, the composition should generally have a particle size in the range of about 1/32 inch to about 1/2 inch diameter, preferably in the range of from about 1/32 inch to about 1/4 inch diameter.

It is further presently preferred to use a composition having a surface area in the range of about 1 square meter per gram ($m^2/g$) to about 1000 square meters per gram of composition, preferably in the range of from about 1 $m^2/g$ to about 800 $m^2/g$.

The desulfurized hydrocarbon stream can be separated from the sulfurized composition by any appropriate separation method known in the art thereby forming a separated desulfurized hydrocarbon stream and a separated sulfurized composition.

Examples of such means are cyclonic devices, settling chambers, impingement devices for separating solids and gases, and the like and combinations thereof. Separation can include, but is not limited to, allowing the hydrocarbon stream to flow out of the desulfurization zone. The desulfurized gaseous cracked gasoline or desulfurized gaseous diesel fuel, can then be recovered and preferably liquefied. Liquification of such desulfurized hydrocarbon streams can be accomplished by any manner known in the art.

The amount of sulfur in the desulfurized hydrocarbon stream, following treatment in accordance with a desulfurization process of the present invention, is less than about 500 ppm sulfur by weight of hydrocarbon stream, preferably less than about 150 ppm sulfur by weight of hydrocarbon stream, and more preferably less than about 50 ppm sulfur by weight of hydrocarbon stream.

In carrying out the process of the present invention, if desired, a stripper unit can be inserted before and/or after the regeneration of the sulfurized composition. Such stripper will serve to remove a portion, preferably all, of any hydrocarbon from the sulfurized composition. Such stripper can also serve to remove oxygen and sulfur dioxide from the system prior to the introduction of the regenerated composition into the reduction zone. The stripping comprises a set of conditions that include total pressure, temperature, and a stripping agent partial pressure.

Preferably, the total pressure in the stripper when employed is in the range of from about 25 psia to about 500 psia.

Temperature for such stripping can be in the range of from about 37.8° C. to about 537.8° C.

The stripping agent is a composition that helps to remove hydrocarbon from the sulfurized composition. Preferably, the stripping agent is nitrogen. The sulfurized composition can have sulfur contained therein (for example, within the pores of the composition) or thereon (for example, located on the surface of the composition).

The regeneration zone employs a set of conditions that includes total pressure and sulfur removing agent partial pressure. The total pressure is generally in the range of from about 25 psia to about 50 psia.

The sulfur removing agent partial pressure is generally in the range of from about 1% to about 25% of the total pressure.

The sulfur-removing agent is a composition that helps to generate gaseous sulfur containing compounds and oxygen containing compounds such as sulfur dioxide, as well as to burn off any remaining hydrocarbon deposits that might be present. The preferred sulfur removing agent suitable for use in the regeneration zone is selected from oxygen containing gases such as, but not limited to, air.

The temperature in the regeneration zone is generally in the range of from about 37.8° C. to about 815.5° C., preferably in the range of from about 426.7° C. to about 648.9° C.

The regeneration zone can be any vessel wherein the desulfurizing or regeneration of the sulfurized composition can take place.

The regenerated composition is then reduced in a reduction zone with a reducing agent including, but not limited to, hydrogen, so that at least a portion of the promoter content of the composition is reduced to produce a reduced composition having a reduced valence promoter content to permit the removal of sulfur from the hydrocarbon stream according to the inventive process disclosed herein.

In general, when practicing the present invention, reduction of the desulfurized composition is carried out at a temperature in the range of from about 37.8° C. to about 815.5° C. and at a pressure in the range of from about 15 psia to about 1500 psia. Such reduction is carried out for a time sufficient to achieve the desired level of reduction of the promoter. Such reduction can generally be achieved in a time period in the range of from about 0.01 hour to about 20 hours.

Following the reduction of the regenerated composition, at least a portion of the resulting reduced composition can be returned to the desulfurization zone.

In carrying out the process of the present invention, the steps of desulfurization, regeneration, reduction, and optionally stripping before and/or after such regeneration can be accomplished in the single zone or vessel or in multiple zones or vessels.

When carrying out the process of the present invention in a fixed bed reactor system, the steps of desulfurization, regeneration, reduction, and optionally stripping before and/or after such regeneration are accomplished in a single zone or vessel.

The desulfurized cracked gasoline can be used in the formulation of gasoline blends to provide gasoline products suitable for commercial consumption and can also be used where a cracked gasoline containing low levels of sulfur is desired.

The desulfurized diesel fuel can be used in the formulation of diesel fuel blends to provide diesel fuel products.

EXAMPLES

The following examples are presented to further illustrate the invention and are not to be considered as limiting the scope of the invention.

Example I (Inventive)

A base component was prepared as follows: first; alumina (15 wt %), clay (12 wt %), perlite (18 wt %), and zinc oxide (55 wt %) were slurried together in water. The slurry was then spray-dried at a temperature of 500° C. and then calcined at 635° C. for 1 hour. The calcined slurry was then impregnated with nickel nitrate hexahydrate and then dried at 150° C. for 1 hour and calcined at 635° C. for 1 hour. The nickel component is approximately 17 weight percent of the base component.

A composition with 5 weight percent gallium was then prepared. An 18.39-gram quantity of gallium nitrate was dissolved in 51.17 grams of water. The aqueous gallium nitrate solution was then impregnated in the base component using an ultrasonic nozzle. The composition was then dried at 150° C. for 1 hour and calcined at 635° C. for 1 hour.

Example II (Inventive)

The composition as prepared in Example I was tested for its desulfurization activity as follows. 10 grams of the material as prepared was placed in a ½ inch diameter stainless steel tube having a length of about 36 inches and having a stainless steel frit positioned above the lower one-fourth so as to provide an inert support for the bed of the composition.

During each reaction cycle, the reactor was maintained at a temperature of 398.9° C. and a pressure of 150 psig. Hydrogen flow was at 169.9 standard cubic centimeters per minute (sccm). A full range cracked gasoline feed was pumped upwardly through the reactor at a rate of 106.4 ml per hour. Such conditions are hereinafter referred to as "reaction conditions."

The gasoline feed had a sulfur content of 1400 parts per million (ppm) sulfur. This feed contained thiophenes, benzothiophenes, mercaptans, and sulfides.

Before Cycle 1 was initiated, the composition was reduced with hydrogen flowing at a rate of 472 sccm at a temperature of 454.4° C. for a period of one hour. Such conditions are hereinafter referred to as "reducing conditions." Each reaction cycle consisted of six hours with the product sulfur (ppm) for each cycle measured after one, two, three, and four hours of exposure to the feed.

After completion of the reaction cycle, the composition was flushed with 472-sccm hydrogen at 454.4° C. for thirty minutes and 472 sccm nitrogen at 454.4° C. for thirty minutes. The temperature was then raised to 482.2° C. where the composition was regenerated first under 236-sccm air and 236-sccm nitrogen for one hour and then 472-sccm air for thirty minutes. The temperature was then decreased to 398.9° C. and the sample purged with nitrogen for 30 minutes. Such conditions are hereinafter referred to as "regeneration conditions." Cycle 2 began, like Cycle 1 under reducing conditions; i.e., with treatment at 398.9° C. of the composition in hydrogen at a flow rate 472 sccm for one hour.

The composition of Example I was tested over several reaction cycles with regeneration occurring after each cycle. The results in Table I were obtained where the values given are the weight percent conversion taken at the sixth hour of each cycle. A first order rate constant is assumed. The average sulfur conversion was found to be 80%. The average desulfurization activity as relative rate constant was 1.3.

TABLE I

| Cycle | Conversion (wt. %) | Relative Rate Constant |
|---|---|---|
| 1 | 73.2 | 1.0 |
| 5 | 74.8 | 1.1 |
| 6 | 77.5 | 1.2 |
| 7 | 77.8 | 1.2 |
| 8 | 79.3 | 1.2 |
| 9 | 82.0 | 1.3 |
| 10 | 81.4 | 1.3 |
| 11 | 80.0 | 1.2 |
| 12 | 82.2 | 1.3 |
| 13 | 82.6 | 1.4 |

Example III (Control)

A slurry of zinc oxide, alumina and perlite was spray-dried at about 500° C. The resulting microspheres were calcined at 635° C. for about 1 hour and impregnated with nickel nitrate hexahydrate such that the finished product contained 16% nickel. The material was then dried at 150° C. for 1 hour and calcined at 635° C. for 1 hour.

Example IV (Control)

The composition prepared in Example III was tested for its desulfurization activity as follows.

10 grams of the material as prepared was placed in a ½ inch diameter stainless steel tube having a length of about 36 inches and having a stainless steel frit positioned above the lower ¼ so as to provide an inert support for the bed of the composition.

The same reaction conditions for Example II apply also to this example.

The gasoline feed had a sulfur content of 1400 parts per million (ppm) sulfur. This feed contained thiophenes, benzothiophenes, mercaptans, and sulfides.

Before Cycle 1 was initiated, the composition was reduced in accordance with the reducing conditions as described in Example II. Each reaction cycle of consisted of six hours.

After completion of the reaction cycle, the composition was regenerated in accordance with the regeneration conditions as described in Example II. Cycle 2 began like Cycle 1 under reducing conditions; i.e., with treatment at 398.9° C. of the composition and hydrogen at a flow rate of 472 sccm for one hour.

The composition of Example III was tested over several reaction cycles with regeneration occurring after each cycle. The average sulfur conversion for the composition in Example III was found to be 73%. The average relative rate constant for the composition of Example III was found to be 1.0.

Therefore, the inventive composition of Example I is, on average, more active than the composition of Example III.

While this invention has been described in detail for the purpose of illustration, it should not be construed as limited thereby, but intended to cover all changes and modifications within the spirit and scope thereof.

That which is claimed:

1. A process for the removal of sulfur from a hydrocarbon stream comprising:

(a) contacting said hydrocarbon stream with a composition consisting of a metal oxide, a silica-containing material, an aluminum-containing material selected from the group consisting of alumina, aluminate, and combinations thereof, a gallium-containing material, and a promoter metal wherein at least a portion of said promoter metal is present as a reduced valence promoter and in an amount which will effect the removal of sulfur from said hydrocarbon stream in a desulfurization zone under conditions such that there is formed a desulfurized hydrocarbon stream and a sulfurized composition;

(b) separating said desulfurized hydrocarbon stream from said sulfurized composition thereby forming a separated desulfurized hydrocarbon stream and a separated sulfurized composition;

(c) regenerating at least a portion of said separated sulfurized composition in a regeneration zone so as to remove at least a portion of the sulfur contained therein and/or thereon thereby forming a regenerated composition;

(d) reducing said regenerated composition in an activation zone so as to provide a reduced composition having a reduced valence promoter metal content therein which will effect the removal of sulfur from a hydrocarbon stream when contacted with same; and thereafter (e) returning at least a portion of said reduced composition to said desulfurization zone.

2. A process in accordance with claim 1 wherein said hydrocarbon stream comprises a fuel selected from the group consisting of cracked-gasoline, diesel fuel, and combinations thereof.

3. A process in accordance with claim 1 wherein said desulfurization in step (a) is carried out at a temperature in the range of from about 37.8° C. to about 537.8° C. and a pressure in the range of from about 15 to about 1500 psia for a time sufficient to effect the removal of sulfur from said stream.

4. A process in accordance with claim 1 wherein said regeneration in step (c) is carried out at a temperature in the range of from about 37.8° C. to about 815.5° C. and a pressure in the range of from about 10 to about 1500 psia for a time sufficient to effect the removal of at least a portion of the sulfur from said separated sulfurized composition.

5. A process in accordance with claim 1 wherein air is employed in step (c) as a regeneration agent in said regeneration zone.

6. A process in accordance with claim 1 wherein said regenerated composition from step (c) is subjected to reduction with hydrogen in step (d) in said reduction zone which is maintained at a temperature in the range of from about 37.8° C. to about 815.5° C. and at a pressure in the range of from about 15 to about 1500 psia and for a period of time sufficient to effect a reduction of the valence of the promoter content of said regenerated composition.

7. A process in accordance with claim 1 wherein said separated sulfurized composition from step (b) is stripped prior to introduction into said regeneration zone in step (c).

8. A process in accordance with claim 1 wherein said regenerated composition from step (c) is stripped prior to introduction to said reduction zone in step (d).

* * * * *